(No Model.)

J. SNELL & A. VAN SLYKE.
WINDOW BLIND.

No. 360,058. Patented Mar. 29, 1887.

Witnesses
F. L. Durand
Harry Y. Davis

Inventors,
John Snell
Alexander Van Slyke
By their Attorney
Wm. N. Finckel

United States Patent Office.

JOHN SNELL AND ALEXANDER VAN SLYKE, OF FORT PLAIN, NEW YORK, ASSIGNORS TO SAID VAN SLYKE, WILLIAM KINEMAN, AND GEORGE HAMBRECHT, ALL OF SAME PLACE.

WINDOW-BLIND.

SPECIFICATION forming part of Letters Patent No. 360,058, dated March 29, 1887.

Application filed November 29, 1886. Serial No. 220,153. (No model.)

*To all whom it may concern:*

Be it known that we, JOHN SNELL and ALEXANDER VAN SLYKE, citizens of the United States, residing at Fort Plain, in the county of Montgomery and State of New York, have invented a certain new and useful Improvement in Window-Blinds, of which the following is a full, clear, and exact description.

This invention has for its object the provision of simple and cheaply-made means for operating movable blind-slats and holding them in any desired position to which they may be adjusted.

Heretofore a variety of devices have been devised and patented having the same general object in view, and in general terms, in common with our invention, they have comprised a rod or bar connected to the slats, so as to rotate them upon their tenons or gudgeons, and a locking device engaging such rod or bar to retain it, and through it the slats, in desired adjustment. Our device, therefore, is in the nature of an improvement upon such window-blinds; and the invention consists in certain details of construction, as we will hereinafter particularly set forth and then claim.

Figure 1:
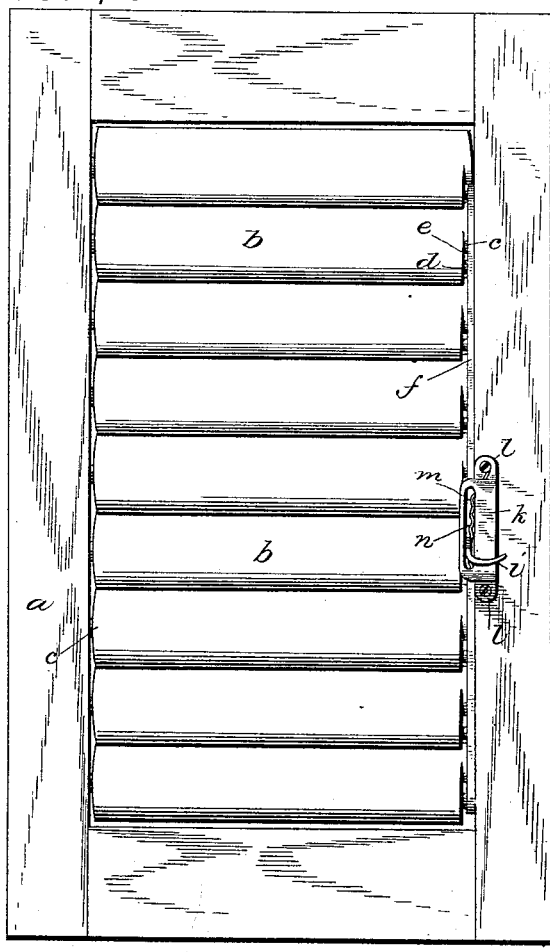
Figure 2:
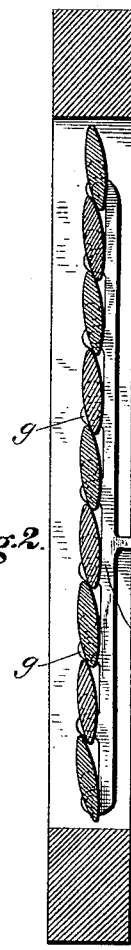
Figure 3:
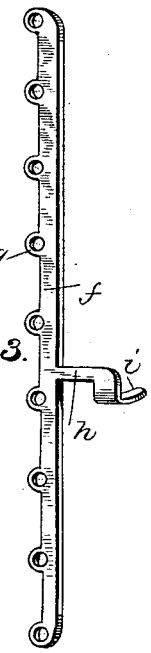
Figure 5:
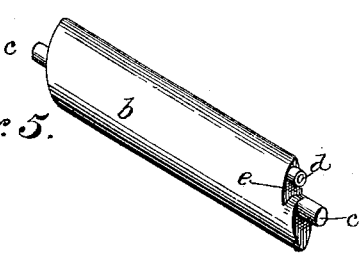
Figure 4:
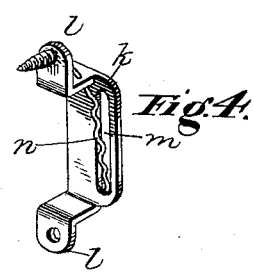

In the accompanying drawings, in the several figures of which like parts are similarly designated, Figure 1 is an elevation of a window-blind; Fig. 2, a vertical section; Fig. 3, a perspective view of the operating rod or bar; Fig. 4, a perspective view of the locking or retaining device for the bar, and Fig. 5 a perspective view of one of the slats.

As illustrated in the form shown in the drawings, $a$ is the frame of a window-blind, and $b$ a series of slats secured therein by end tenons or gudgeons, $c$, so as to be capable of being more or less rotated therein. At one end each of these slats is provided with a second tenon, or, more properly, perhaps, a lug, $d$, projecting therefrom eccentrically with respect to the main tenons $c$, and arranged in a recess, $e$, made at one side of the slat, so as to receive the operating-bar snugly within the blind. These lugs $d$ may be rollers or pins secured to the slats. A bar or rod, $f$, is provided having a series of perforated ears, $g$, at one edge, corresponding in number with the number of slats in the blind, and each ear is adapted to receive in its perforation one of the lugs $d$ of the slats, and said bar fits within the recesses $e$ of said slats, so as not to project beyond the blind. This bar is also provided with a projecting arm, $h$, on the side opposite the ears $g$, and it has a thumb-piece, $i$, turned horizontally therefrom at right angles. This bar, with its perforated ears and thumb-piece, is most economically, and by preference, cut from sheet metal in a single piece, so as to avoid soldering.

The catch, lock, or retaining device for the bar consists of a case, $k$, having ears $l$, whereby it may be readily affixed, as by screws, to the blind-frame; and said case has a vertical slot, $m$, through which the thumb-piece and arm of the bar project, the thumb-piece being outside and the arm within the case. To one of the fastening-screws of the case is secured one end of a crimped wire, $n$, which projects through a hole in the upper end of the case, and its free end extends thence into the case and across the slot therein, so as to bear against the arm $h$ of the slat-operating bar with sufficient force to hold said bar in whatever position it may be placed to effect the proper or desired adjustment of the slats.

The operation is obvious. The bar is grasped by the thumb-piece and a vertical up or down movement given to it to effect the rotation of the slats, or, in common parlance, to open the slats more or less. The resistance of the spring is overcome by force. Each crimp in the spring serves as a notch or tooth in a rack to engage and hold the arm of the operating-bar. By having one end of the "spring-rack," as we term it, free, the said rack is rendered freer in operation and less liable to unduly bind the bar.

The case of the catch may be stamped up out of sheet metal and all the exposed parts more or less ornamentally finished.

What we claim is—

1. The window-blind frame set forth, combined with the slats provided with tenons or gudgeons fitted in said frame, and upon which said slats are capable of rotation within the frame, and having recesses $e$ and lugs $d$, the operating-bar $f$, having perforated ears to engage such lugs and arranged within the recesses of the several slats, and an operating thumb-piece on said bar, and a catch, lock, or retaining device, into which the thumb-piece of said bar projects and by which it is positively engaged, substantially as described.

2. A catch for window-blind-operating rods, comprising a case, $k$, and a crimped-wire spring secured at one end to the case and having its other end projecting freely into the case, substantially as described.

In testimony whereof we have hereunto set our hands this 20th day of November, A. D. 1886.

JOHN SNELL.
ALEXANDER VAN SLYKE.

Witnesses:
 ODILLON B. ELDREDGE,
 HENRY M. ELDREDGE.